No. 729,760. PATENTED JUNE 2, 1903.
G. V. GUZMAN.
PROCESS OF REDUCING AND SEPARATING SILVER.
APPLICATION FILED MAY 19, 1902.
NO MODEL.
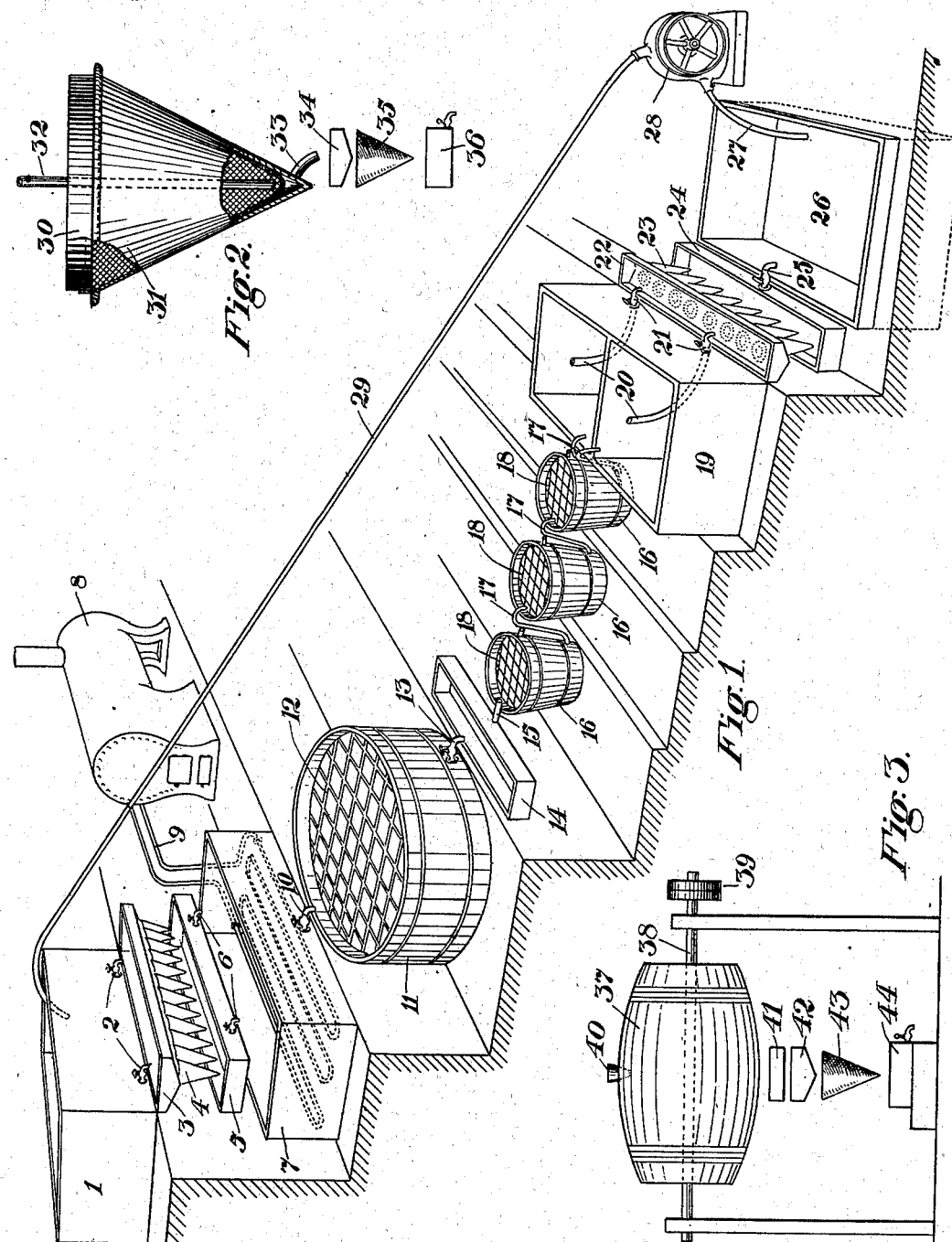
Witnesses:
Robert Head
M. Ralph Julian Sachers
Inventor:
Gerardo Vaca Guzman,
By his Attorney,
F. A. Richards.

No. 729,760. Patented June 2, 1903.

UNITED STATES PATENT OFFICE.

GERARDO VACA GUZMAN, OF SUCRE, BOLIVIA.

PROCESS OF REDUCING AND SEPARATING SILVER.

SPECIFICATION forming part of Letters Patent No. 729,760, dated June 2, 1903.

Application filed May 19, 1902. Serial No. 107,891. (No specimens.)

*To all whom it may concern:*

Be it known that I, GERARDO VACA GUZMAN, a citizen of Bolivia, residing in Sucre, Bolivia, have invented certain new and useful Improvements in Processes of Reducing and Separating Silver, of which the following is a specification.

The present invention relates to the extraction and reduction of metallic silver from ores so poor as to render any process of smelting or fusion inapplicable.

It more particularly refers to the extraction of metallic silver from argentiferous blendes and galenas which when the proportion of silver was below a certain amount was not considered worth extracting.

It is old in the art of extracting silver from argentiferous ores to add an impure mixture of cupric and ferric salts called "magistral" to a watery mass of ore, common salt, and mercury, this process being known as the "Patio" process, from which mixture finally the mercury was distilled and the silver left behind. The chemical reaction during this process is as follows: The sulfates of copper and iron in the magistral are converted by the sodium chlorid into the corresponding chlorids, which then react with the silver sulfid to form silver chlorid. The thus-resulting silver chlorid is held in solution by the sodium chlorid and on adding metallic mercury is decomposed, yielding calomel and metallic silver. All the mercury converted into calomel is lost for the process, and this makes the process itself, therefore, quite expensive. It is also known that cuprous chlorid in the presence of sodium chlorid changes the silver sulfid into the silver chlorid, forming thereby metallic copper,

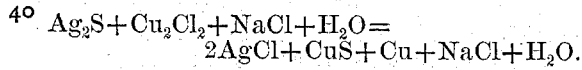

The solution of sodium chlorid when saturated dissolves the silver chlorid. This solubility has been made use of in the "Augustine" process, in which the silver is precipitated from the double chlorids of silver and sodium by means of metallic copper; but this process has not yielded satisfactory results and was in time superseded by the "Ziervogel" process, consisting in the separation of the silver from the sulfid by lixiviation with hot water containing some sulfuric acid. Chloridized ores may also be reduced by the "Von Patera" process of using a solution of hyposulfite of sodium or lime, which takes up the silver chlorid, from which solution the metal can be precipitated by an alkaline sulfuret. Thiosulfate of copper and soda has finally been used in the "Russel" process to decompose the sulfureted, antimoniureted, or arseniureted combinations of silver by lixiviating the same with sodium thiosulfate in order to dissolve the silver chlorid and afterward saving an additional amount of silver by adding copper thiosulfate. The chemical reaction taking place in the extraction of silver from chloridized ores was not understood for quite some time, and it was believed that as cuprous chlorid was produced as one of the by-products of the reaction of cupric chlorid with silver sulfate both cupric and cuprous chlorids were present in the reagent at the same time. This error has been corrected long ago, and it was conclusively shown that such reaction cannot take place. All these processes require the use of comparatively richer ores and are substantially not applicable in the treatment of blendes and galenas.

The main object of the present invention, therefore, is to supply a process for the treatment of poor ores and of argentiferous blendes and galenas which heretofore were not fit for any of the known metallurgical processes.

Another object of the present invention is to supply a process which in certain cases does not require roasting or chloridization of the ores.

A further object is to furnish a process which facilitates the process of and time in extracting silver and which is less expensive than any of the processes known heretofore and gives better results than lixiviation, amalgamation, &c.

For these purposes the present invention consists in the employment of a certain solution which has a chloridizing and at the same time a dissolving effect and which acts upon the roasted and chloridized ores even when the chloridizing was entirely incomplete. It changes the silver sulfid which has not been decomposed during the roasting process, as well as the antimoniates and arsenates of silver formed during the roasting process into the silver chlorid. This silver chlorid just formed, together with that formed in the previous roasting and chloridizing process, is dissolved in the said solution, from which it is precipitated or reduced to metallic silver by means of metallic copper or lead. This principal solution or reagent employed consists of a mixture of cupric chlorid and cuprous chlorid, in which the former always predominates. As stated hereinbefore, cuprous chlorid has been used heretofore for transforming silver sulfid into the silver chlorid; but its stability in solution is so small that shortly after its formation it loses to a great extent its chloridizing properties upon the sulfureted, antimoniureted, and arseniureted silver by being reduced to cuprous oxychlorid. A solution of cupric chlorid is more steady and has similar chloridizing properties upon silver compounds existing in argentiferous ores, and a mixture of the two gives the most satisfactory results, and the reactions taking place in the process of extracting silver are as follows:

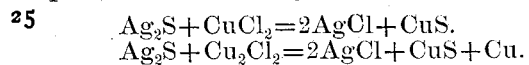

$$Ag_2S + CuCl_2 = 2AgCl + CuS.$$
$$Ag_2S + Cu_2Cl_2 = 2AgCl + CuS + Cu.$$

This double solution of cupric chlorid and cuprous chlorid is prepared by pulverizing and sieving copper pyrites and mixing the same with twenty per cent., in weight, of sodium chlorid. This mixture is then roasted for about two hours at not more than dark-red heat, whereby a thorough calcining and chloridizing takes place. The roasted mixture is now placed into a vat, and a sodium-chlorid solution of about 20° to 25° Baumé, having a temperature of about 100° centigrade, is passed through the same and tapped off from the vat, containing now the cupric chlorid and cuprous chlorid in solution in the proper proportion for use in the process of extracting silver.

The accompanying drawings, forming part of the present application, illustrate in Figure 1 a perspective view of a plant for extracting silver from its ores according to the present invention. Fig. 2 illustrates a device for washing the metallic silver, and Fig. 3 shows a simple device for removing the silver adhering to the granulated copper.

The chloridizing and dissolving reagent, prepared as stated hereinbefore, is placed in a vat 1, constructed of wood or masonry. By opening the drain-cocks 2 it runs into a filtering-box 3, provided with a series of cone-shaped bag-filters 4, and through those into a collecting-tank 5. From there the solution is drained off through cocks 6 into a tank 7, in which it may be heated from a boiler 8 by means of steam-coils 9. The roasted and pulverized ore is placed on removable screens 12 of a lixiviating-vat 11. The reagent is delivered from the collecting-tank 5 into the lixiviating-vat 11 through a drain-cock 10 and acts now upon the ore according to the formulas hereinabove set forth. The liquid discharged from this tank 11 through the cock 13, located near the bottom of the tank 11, contains the silver chlorid and passes first into a receiving and distributing tank 14 and from there, by means of a pipe or pipes 15, into a series of slightly-cone-shaped vats 16. The drawings illustrate only one set of vats; but more sets may be arranged parallel to each other by employing more discharge pipes 15.

The vats 16 are provided with removable filters 18 and communicate among themselves by means of rubber tubes 17. The vats 16 are located on different levels and the liquid passes from the higher to the lower by means of the rubber tubes 17, so that the liquid already filtered in one of the vats is passed to and filtered again in the other vats. The filters 18 are covered with the reducing agent, consisting of granulated metallic copper or lead. In these vats 16 the silver is now reduced to its metallic state and deposited upon the granulated reducing agent placed on the filters 18. If copper is employed as a reducing agent, the reduced silver is very pure and consists of comparatively large crystals, which have no tendency of clogging the filters 18. When lead is employed as a reducing agent, the liquid must enter the vats 16 from below, thereby rising upward through the filters 18; otherwise the filters 18 would become clogged very soon by the silver precipitate, which in this case consists of relatively fine powder mixed with lead and zinc salts.

The liquid which has passed through the vats 16 is nearly entirely free from silver, but contains lead, zinc, and copper salts, especially when blendes and galenas have been treated, and it becomes necessary to eliminate these salts before reusing the solution. For this purpose a precipitation-tank 19 is provided, having overflow-pipes 20 connected to cocks 21. The pipes 20 are preferably made of rubber and fastened below a float, (not shown in the drawings,) so as to decant always the uppermost strata of the contents of the tank 19. This tank contains lime-water saturated with common salt, and the lead, zinc, and copper salts are precipitated therein in the form of hydroxids and may be removed from the bottom thereof from time to time. The cocks 21 discharge the liquid through a filtering-box 22, provided with a series of bag-filters 23, into a collecting-tank 24 and from there through a cock 25 into a receiving-tank 26. From here the regenerated solution may be withdrawn through a pipe 27 and by means of a pump 28 forced back through pipe 29 into the upper tank 1 in order to be used over again in the process of extraction. When the ores treated by the solution do not consist of blendes or galenas and if copper has been employed as a reducing agent, the regenerated solution contains substantially the original proportion of cupric chlorid and cuprous chlorid. If the latter should be in excess, it may easily be eliminated in part by placing metallic iron into the tank 19. After the treatment of the blendes or galenas in eliminating the lead and zinc salts also some of the cuprous chlorid has been eliminated, and it becomes necessary to add a proper proportion of the same to the solution in tank 1 before using the same again for extracting silver.

As soon as there is a sufficient quantity of metallic silver precipicated on the reducing agent in the vats 16 the contents of the filters 18 are discharged, the product dried, and the silver separated from the coarse granulated reducing agent by sieving. The silver is placed into the washing apparatus illustrated in Fig. 2, which consists of a vat 30, provided in its lower cone-shaped part 31 with canvas filters, which allow the water to pass through but retain the metallic silver. Through a pipe 32, reaching to the bottom of the vat 30, hot water is charged into the vat 30, which dissolves all the remaining salts that could have adhered to the silver and then is drained off through a tap 33 into a tank 34, through the filler 35 into a receiver 36, in which receptacles any trace of silver may be collected which accidentally may have remained in the water.

The granulated metal used as a reducing agent, which may have some silver adhering thereto, can be placed into a barrel 37, Fig. 3, rotatably mounted on a shaft 38 and operated by means of a pulley 39. The metal is mixed with water and agitated until the silver and the oxids have been mechanically removed from the granulated metal, and then the contents of the barrel are discharged through the tap-hole 40 into the collectors 41, then the tank 42, and through the filters 43 into the receiver 44. The reducing agent is retained in 41 and the metallic silver in the filters 43. The silver collected in the filters 18, 35, and 43 is almost pure and can be melted and refined in the usual manner.

The ores used in this plant are preferably roasted in open-air furnaces and crushed and pulverized so that they pass a No. 40 to 60 wire screen. In the treatment of argentiferous blendes or galenas ten per cent. of iron pyrites is preferably added before the roasting process. When ores are to be treated which do not require roasting or calcining, the solution in tank 7 is preferably heated, and if much copper pyrites should be contained in the ores it will not be necessary to add cuprous chlorid to the regenerated solution, for the same is formed in sufficient quantity in the lixiviation-tank 11. Crude ores after chloridizing and roasting may preferably be washed on the filters 12 in the vat 11 by means of hot or cold water.

Having now described the present invention, that which is considered new and useful, and is desired to be secured by Letters Patent, is—

1. The process of extracting and separating silver from its ores, which consists in subjecting the ores to the action of a preprovided solution containing predetermined quantities of more than one of the chlorids of copper, passing the resulting solution through a reducing agent, and removing and collecting the metallic silver from said reducing agent.

2. The process of extracting and separating silver from its ores, which consists in subjecting roasted ores to the action of a preprovided aqueous solution of cupric chlorid and cuprous chlorid, passing the resulting solution through granulated metal, and removing and collecting the metallic silver from said metal.

3. The process of extracting and separating silver from its ores, which consists in subjecting roasted ores to the action of a preprovided aqueous solution containing predetermined quantities of cupric chlorid and cuprous chlorid, passing the resulting solution through granulated copper, and removing and collecting the metallic silver from said copper.

GERARDO VACA GUZMAN.

Witnesses:
RALPH JULIAN LACHERS,
FRED. J. DOLE.